US007265957B2

(12) United States Patent
Brucker

(10) Patent No.: US 7,265,957 B2
(45) Date of Patent: Sep. 4, 2007

(54) RESTORING ELECTRICAL LOAD TO DISTRIBUTION FEEDER CIRCUITS

(75) Inventor: David Stephen Brucker, El Paso de Robles, CA (US)

(73) Assignee: Cooper Technologies Company, Houston, TX (US)

( * ) Notice: Subject to any disclaimer, the term of this patent is extended or adjusted under 35 U.S.C. 154(b) by 401 days.

(21) Appl. No.: 10/870,430

(22) Filed: Jun. 18, 2004

(65) Prior Publication Data

US 2005/0280963 A1   Dec. 22, 2005

(51) Int. Cl.
*H02H 3/00* (2006.01)
(52) U.S. Cl. .......................................... 361/62; 361/64
(58) Field of Classification Search ............. 361/61–71
See application file for complete search history.

(56) References Cited

U.S. PATENT DOCUMENTS

| 4,402,059 | A | * | 8/1983 | Kennon et al. ............. 713/300 |
| 5,341,268 | A | * | 8/1994 | Ishiguro et al. ............... 361/62 |
| 5,784,237 | A | * | 7/1998 | Velez ........................... 361/62 |
| 5,973,899 | A |   | 10/1999 | Williams et al. |
| 6,275,366 | B1 | * | 8/2001 | Gelbien et al. ............... 361/62 |
| 2004/0027747 | A1 |   | 2/2004 | Kim et al. |

OTHER PUBLICATIONS

"Kyle® Form 6 Microprocessor-Based Recloser Controls for Pole, Rack, and Yard Mount Applications Frequently Asked Questions," Cooper Power Systems, Nov. 2001, pp. 1-16.

"Reclosers—Form 6 Microprocessor-Based Pole Mount Recloser Control Installation and Operation Instructions," Cooper Power Systems, S280-70-3, May 2002, pp. 1-44.

"Reclosers—Kyle® Form 6 Microprocessor-Based Recloser Control Programming Guide," Cooper Power Systems, S280-70-4, Sep. 2003, pp. 1-1 thru 2-52.

Karl Zimmerman et al., "Trip and Restore Distribution Circuits at Transmission Speeds," Rural Electric Power Conference, New York, NY, May 2, 1999, pp. A2-1 to A2-9, XP-001099664.

S.P. Websper et al., "An investigation into breaker reclosure strategy for adaptive single pole autoreclosing," IEE Proceedings: Generation, Transmission and Distribution, Institution of Electrical Engineers, GB, vol. 142, No. 6, Nov. 1, 1995, pp. 601-607.

(Continued)

*Primary Examiner*—Michael Sherry
*Assistant Examiner*—Danny Nguyen
(74) *Attorney, Agent, or Firm*—Fish & Richardson P.C.

(57) ABSTRACT

Automatically de-energizing and re-energizing a section of a distribution feeder circuit includes detecting, using a module of a protective device, whether a section of a distribution feeder circuit upstream of the protective device has been de-energized and whether the protective device may be opened automatically. The module signals for the protective device to be opened when the section has been de-energized and when the protective device may be opened automatically. The module also is used to detect whether the protective device has been opened and may be closed automatically, and whether the section of the distribution feeder circuit upstream of the protective device has stabilized. The module is used to signal for the protective device to be closed automatically when the protective device has been opened automatically and may be closed automatically, and when the section of the distribution feeder circuit upstream of the protective device has stabilized.

51 Claims, 10 Drawing Sheets

OTHER PUBLICATIONS

PCT Written Opinion of the International Searching Authority (Application No. PCT/US2005/021388), mailed Dec. 22, 2005, 7 total pages.
PCT International Search Report (Application No. PCT/US2005/021388), mailed Dec. 22, 2005, 6 total pages.
PCT International Preliminary Report on Patentability (Chapter I of the Patent Cooperation Treaty), in related Application No. PCT/US2005/021388, mailed Jan. 4, 2007, 9 pages.

* cited by examiner

RESTORING ELECTRICAL LOAD TO DISTRIBUTION FEEDER CIRCUITS

TECHNICAL FIELD

This document relates to restoring electrical load to distribution feeder circuits.

BACKGROUND

A distribution feeder circuit branches electrical circuits from a substation such that power from the substation may be distributed over the branches created by the distribution feeder circuit. A protective device may open the distribution feeder circuit in response to an electrical fault to prevent or reduce damage to the distribution feeder circuit, electrical apparatus or systems connected to the distribution feeder circuit, real property, or personnel in the immediate vicinity of the electrical fault. Some distribution feeder circuits include multiple protective devices that sectionalize the distribution feeder circuit, and that each open the distribution feeder circuit when a fault is detected on a corresponding section of the distribution feeder circuit. The opening of the distribution feeder circuit by a protective device de-energizes a portion of the distribution feeder circuit beyond the protective device. The fault and associated arcing may be cleared by opening a protective device. The protective device tests whether the fault has been cleared by reclosing and re-energizing the sectionalized portion of the distribution feeder circuit. If the fault has been cleared, the protective device remains closed, and a downstream section of the feeder is re-energized, thereby restoring power to connected loads. If the fault has not been cleared, then the protective device may once again attempt to clear the fault by opening. If repeated attempts to clear the fault fail, the protective device goes to a "lock out" condition in which human intervention is needed to reclose the protective device.

The action of de-energizing the distribution feeder circuit or sections thereof removes the source of power to single and three phase electrical loads serviced by the de-energized distribution feeder circuit or the sections thereof. When the circuit is re-energized, the sectionalized portion of the distribution feeder circuit experiences higher than normal loads, due to a lack of load diversity and higher electrical currents caused by the re-energization of electrical motors and transformers, which is referred to as cold load inrush. Excessively high inrush currents may cause other protective devices downstream of the sectionalized portion of the distribution feeder circuit to reopen the distribution feeder circuit even though a new fault has not occurred.

In order to prevent excessively high inrush currents from causing additional unwanted service interruptions, utility personnel may be dispatched to each of the protective devices downstream of the sectionalizing protective device to manually open the protective devices prior to re-energizing the distribution feeder circuit in an operation known as manual sectionalizing. After the distribution feeder circuit is manually sectionalized, the distribution feeder circuit is progressively re-energized starting at a section protected by a protective device immediately up-stream from the fault and proceeding section by section to the protective device farthest from the source of electrical power in a process is known as picking-up load. Load pick-up is aided by a procedure known as cold load pick-up (CLPU), which requires an operator to manually re-energize the distribution feeder circuit at each protective device that was manually opened. One method requires the operator to place an operating handle on the protective device in the "Close with Cold Pick-up" position for a short period of time, usually five to 10 seconds. A second method requires the operator to manually close the circuit by depressing a "close" button. A CLPU electronic circuit then assumes control of the protective device for a period of time during which the protective characteristics of the control mirror the feeder inrush characteristics and prevent a trip due to inrush but not a trip in response to a true fault.

SUMMARY

In one general aspect, automatically reenergizing a section of a distribution feeder circuit includes detecting, using a module of a protective device, whether a section of a distribution feeder circuit upstream of the protective device has been de-energized and whether the protective device may be opened automatically. The module is used to signal for the protective device to be opened when (1) the section of the distribution feeder circuit upstream of the protective device has been de-energized and (2) the protective device may be opened automatically. The module also is used to detect whether the protective device has been opened, whether the protective device may be closed automatically, and whether the section of the distribution feeder circuit upstream of the protective device has stabilized. The module is used to signal for the protective device to be closed automatically when (1) the protective device has been opened automatically and may be closed automatically and (2) the section of the distribution feeder circuit upstream of the protective device has stabilized.

In another general aspect, a system for reenergizing a section of a distribution feeder circuit includes a protective device connected to a distribution feeder circuit that protects a section of the distribution feeder circuit downstream of the protective device. The system also includes logic implemented on the protective device for detecting whether a section of a distribution feeder circuit upstream of the protective device has been de-energized and whether the protective device may be opened automatically, and for signaling for the protective device to be opened when the section of the distribution feeder circuit upstream of the protective device has been de-energized and the protective device may be opened automatically. The logic implemented on the protective device also detects whether the protective device has been opened in response to a fault on the distribution feeder circuit, whether the protective device may be closed automatically, and whether the section of the distribution feeder circuit upstream of the protective device has stabilized. The logic implemented on the protective device signals for the protective device to be closed automatically when (1) the protective device has been opened automatically, (2) the protective device may be closed automatically, and (3) the section of the distribution feeder circuit upstream of the protective device has stabilized, to re-energize the section of the distribution feeder circuit downstream of the protective device.

Implementations may include one or more of the following features. For example, detecting if a section of a distribution feeder circuit upstream of a protective device has been de-energized may include detecting whether magnitudes of current of three phases of electricity flowing through the section of the distribution feeder circuit are each below a minimum current value, whether magnitudes of voltage of the three phases of electricity flowing through the section of the distribution feeder circuit are each below a minimum voltage value, and whether a magnitude of a residual ground current is below a minimum current value. A determination that the section of the distribution feeder circuit upstream of the protective device has been de-energized is made when the magnitudes of the current and the voltage of the three phases of electricity flowing through the section of the distribution feeder circuit are each below minimum values, and when the magnitude of the residual ground current is below a minimum current value.

Detecting if a section of the distribution feeder circuit protected by a protective device has been de-energized may include detecting if the distribution feeder circuit has been de-energized for longer than a de-energization threshold amount of time.

Detecting whether the protective device may be opened automatically may include detecting if a human operator of the protective device has specified that the protective device is not to be opened automatically. For example, detecting if a human operator of the protective device has specified that the protective device is not to be opened automatically may include detecting if the human operator has applied a hot line tag to the protective device, or detecting if the human operator has specified that the protective device is non-reclosing. Detecting if a human operator of the protective device has specified that the protective device is not to be opened automatically also may include detecting if the human operator pressed a trip button in advance of manually tripping the protective device or a close button in advance of manually closing the protective device to prevent the protective device from being opened automatically, or detecting if the human operator pressed an option button that enables an automatic cold load pick up operation.

Detecting whether the protective device may be closed automatically may include detecting if a human operator of the protective device has specified that the protective device is not to be closed automatically. For example, detecting if a human operator of the protective device has specified that the protective device is not to be closed automatically may include detecting if the human operator has applied a hot line tag to the protective device, or detecting if the human operator has specified that the protective device is non-reclosing. Detecting if a human operator of the protective device has specified that the protective device is not to be closed automatically also may include detecting if the human operator pressed a trip button in advance of manually tripping the protective device or a close button in advance of manually closing the protective device to prevent the protective device from being closed automatically, or detecting if the human operator pressed an option button that enables an automatic cold load pick up operation.

Detecting whether the section of the distribution feeder circuit upstream of the protective device has stabilized may include detecting whether magnitudes of voltage of three phases of electricity flowing through the section remain above a normal operating voltage magnitude.

Signaling for the protective device to be closed automatically when the protective device may be closed automatically may include detecting whether the protective device has been able to be closed automatically for longer than a threshold time, and signaling for the protective device to be closed automatically when the protective device has been able to be closed automatically for longer than the threshold time.

The protective device may be a recloser, a breaker, or a switch.

The logic implemented on the protective device may be included in a smart cold load pick up module implemented on the protective device. The smart cold load pickup module may be included in a scratch logic portion or a base logic portion of the protective device.

In another general aspect, restoring electrical load to a distribution feeder circuit includes detecting a fault on a distribution feeder circuit. A first protective device downstream of the fault is opened to prevent damage to downstream sections of the distribution feeder circuit as a result of the fault. A second protective device downstream of the first protective device is opened in response to the opening of the first protective device. When the fault has been cleared and electrical service has stabilized, logic implemented on the first protective device is used to signal for the first protective device to be closed to reapply electrical load to a section of the distribution feeder circuit between the first protective device and the second protective device. Execution of logic implemented on the second protective device is used to wait for the section of the distribution feeder circuit to stabilize after the first protective device is closed, and to signal for the second protective device to be closed to reapply the electrical load to the section of the distribution feeder circuit downstream of the second protective device.

Implementations may include one or more of the following features. For example, detecting a fault on the distribution feeder circuit may include detecting an abnormally high voltage or an abnormally high current on the distribution feeder circuit. Detecting when the fault has been cleared may include detecting a normal operating voltage upstream of the first protective device. Waiting for the section of the distribution feeder circuit to stabilize may include waiting for a period of time needed for the section of the distribution feeder circuit to stabilize. The first and the second protective devices may be reclosers, breakers, or switches.

These general and specific aspects may be implemented using a system, a method, or a computer program, or any combination of systems, methods, and computer programs.

Other features will be apparent from the description and drawings, and from the claims.

DESCRIPTION OF DRAWINGS

Like reference symbols in the various drawings indicate like elements.

DETAILED DESCRIPTION

A section of a distribution feeder circuit may be automatically re-energized by a protective device that originally caused the section to be de-energized for reasons other than a fault on the section of the distribution feeder circuit protected by the protective device. For example, the section is de-energized when a fault is detected on an upstream section of the distribution feeder circuit to reduce the propagation of excessive inrush currents when the protective device is reclosed. Before attempting to re-energize the section of the distribution feeder circuit downstream of the protective device, the protective device verifies that other sections of the distribution feeder circuit upstream from the protective device have re-energized the distribution feeder circuit and that the re-energized sections of the distribution feeder circuit have stabilized. In addition, the protective device verifies that the distribution feeder circuit has been de-energized completely before attempting to re-energize the circuit.

Using protective devices to automatically de-energize and subsequently re-energize the sections of a distribution feeder circuit after a fault eliminates the need to dispatch utility personnel to the protective devices to manually de-energize and re-energize the distribution feeder circuit. Once the fault that caused a section of the distribution feeder circuit to be de-energized has been cleared, all of the protective devices downstream of the fault are closed to re-energize the de-energized sections of the distribution feeder circuit in a short amount of time. Thus, automatically re-energizing the distribution feeder circuit saves time and expense by eliminating the need to dispatch utility personnel to the protective devices and by decreasing the service restoration time. Automatically re-energizing the distribution feeder circuit also allows a more orderly resumption of power by minimizing overcurrent effects associated with energizing multiple large sections of distribution feeder circuits.

Figure 1:
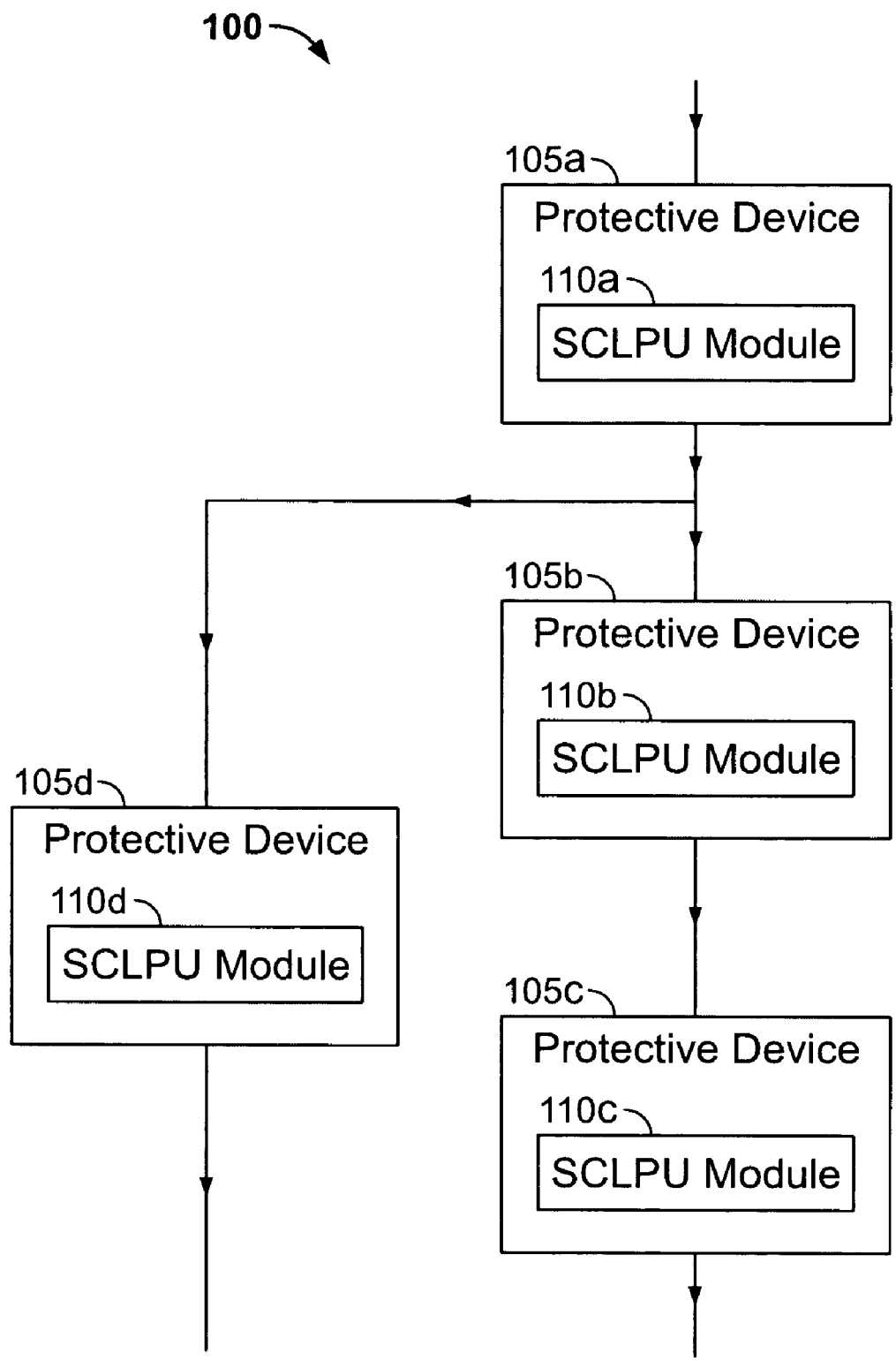
FIG. 1 is a block diagram of a distribution feeder circuit in which cold load pick up operations are automatically performed.

Referring to FIG. 1, a distribution feeder circuit 100 is used to distribute electricity from a single location to multiple other locations. The distribution feeder circuit 100 includes protective devices 105a-105d that protect the distribution feeder circuit 100 and associated devices and systems from damage due to faults. More particularly, each of the protective devices 105a-105d protects a section of the distribution feeder circuit 100 and devices and systems associated with the section from damage due to faults. The protective devices 105a-105d open corresponding sections of the distribution feeder circuit 100 in response to faults, which causes the distribution feeder circuit 100 to be de-energized downstream of any of the protective devices 105a-105d that opened the distribution feeder circuit 100. To recover from the fault, the protective devices 105a-105d close the distribution feeder circuit 100 to re-energize the distribution feeder circuit 100. The re-energizing process is referred to as a cold load pick up (CLPU) operation. The protective devices 105a-105d includes smart cold load pick up (SCLPU) modules 110a-110d, respectively, that cause the protective devices 105a-105d to be closed in a manner that prevents the protective devices 105a-105d from reopening the distribution feeder circuit 100 in response to high current inrush that may occur when the distribution feeder circuit 100 is reenergized.

The distribution feeder circuit 100 branches current from an electrical substation in multiple directions such that power from the substation may be distributed over the branches of the distribution feeder circuit 100. For example, the distribution feeder circuit 100 may connect a distribution substation at a power plant where electricity is generated to multiple power substations at which the electricity is stepped down to a voltage that may be used in normal applications. Similarly, the distribution feeder circuit 100 may connect a power substation to multiple end locations at which electricity is consumed.

The arrows in FIG. 1 indicate the direction of current flow through the distribution feeder circuit 100. In general, points upstream of a particular point in the distribution feeder circuit 100 are points from which current flows to the particular point, and points downstream of the particular point are points in the distribution feeder circuit 100 to which current flows from the particular point.

The protective devices 105a-105d protect the distribution feeder circuit 100 and associated devices and systems from damage due to faults. More particularly, each of the protective devices 105a-105d responds to a fault on a corresponding section of the distribution feeder circuit 100 by removing power from the corresponding section to prevent the fault from being transferred through the distribution feeder circuit 100. The distribution feeder circuit 100 may include any number of protective devices, and four protective devices 105a-105d are used for illustrative purposes only. The protective devices 105a-105d are connected in series with the branches of the distribution feeder circuit 100, such that current flowing through the distribution feeder circuit 100 also flows through the protective devices 105a-105d. In order to remove power from the distribution feeder circuit 100 or sections of the distribution feeder circuit 100, the protective devices 105a-105d prevent current from flowing through the protective devices 105a-105d.

For example, if an abnormally high current is experienced downstream of the protective device 105a, the protective device 105a opens the distribution feeder circuit 100 by preventing current from flowing through the protective device 105a to protect the part of the distribution feeder circuit 100 downstream of the protective device 105a from the fault. Examples of faults include voltages and currents that are significantly larger than normal operating voltages and currents of the distribution feeder circuit 100. The protective devices 105a-105d are reclosers in one implementation, and breakers in another implementation.

When one of the protective devices 105a-105d automatically opens the distribution feeder circuit 100 in response to a fault, other downstream protective devices also may automatically open the distribution feeder circuit. For example, if the protective device 105a automatically opens the distribution feeder circuit 100 in response to a fault, then the protective devices 105b, 105c, and 105d also automatically open the distribution feeder circuit 100. The protective devices 105b, 105c, and 105d may open the distribution feeder circuit 100 after a short time delay has passed after the protected device 105a has opened the distribution feeder circuit 100. The protective devices 105b, 105c, and 105d may infer that the protective device 105 a has opened the distribution feeder circuit 100 through detection that sections of the distribution feeder circuit 100 immediately upstream from the protective devices 105b, 105c, and 105d have been de-energized. The protective devices 105a-105d may automatically open the distribution feeder circuit 100 after certain conditions, such as detection of an upstream protective device that has been opened, are fulfilled.

As a result of the protective devices 105a-105d having been opened the distribution feeder circuit 100, the sections of the distribution feeder circuit 100 downstream of the protective devices 105a-105d are de-energized. After the fault has been cleared, the protective device 105a-105d may perform a CLPU operation in which the distribution feeder circuit 100 is reclosed to allow the distribution feeder circuit to be re-energized. In some situations, closing the protective devices 105a-105d to rapidly reapply load to the distribution feeder circuit 100 causes excessive inrush currents in the distribution feeder circuit 100. The excessive inrush currents may cause the protective devices 105a-105d to open the distribution feeder circuit 100 again, thereby preventing the distribution feeder circuit 100 from being re-energized.

In some implementations, one or more of the protective devices 105a-105d are switches that do not open the distribution feeder circuit 100 in response to faults, and at least one of the protective devices 105a-105d is a protective device upstream of the switches that responds to faults by opening the distribution feeder circuit 100. In such implementations, the switches automatically open the distribution feeder circuit 100 in response to the protective device opening the distribution feeder circuit 100 in response to a fault. The switches may infer that the protective device has opened the distribution feeder circuit 100 through detection that sections of the distribution feeder circuit 100 immediately upstream from the switches have been de-energized. When the fault has been cleared by the protective device, the switches then reclose the distribution feeder circuit 100 to re-energize the distribution feeder circuit 100.

The protective devices 105a-105d execute logic included in the SCLPU modules 110a-110d to facilitate automatically re-energizing the distribution feeder circuit 100 without causing the protective devices 105a-105d to reopen. The protective devices 105a-105d each include and execute the logic included in the SCLPU modules 110a-110d, respectively, to result in the behavior described below. In one implementation, the SCLPU modules 110a-110d are implemented in scratch logic portions of the corresponding protective devices 105a-105d. In another implementation, the SCLPU modules 110a-110d are implemented in base logic portions of the corresponding protective devices 105a-105d.

The SCLPU modules 110a-110d first cause the protective devices 105a-105d that are downstream from a protective device that opened in response to a fault to automatically open the distribution feeder circuit 100. The SCLPU modules 110a-110d then cause the opened protective devices 105a-105d to be closed progressively such that load is not rapidly reapplied to the distribution feeder circuit 100. More particularly, protective devices 105a-105d closer to the fault may be closed before protective devices further away from the fault. In one implementation, a protective device is closed only when the section of the distribution feeder circuit upstream of the protective device has been re-energized and is stable. Progressively closing the protective devices 105a-105d prevents the generation and propagation of high inrush currents that may result from loss of load diversity when re-energizing the distribution feeder circuit 100.

By way of example, after a fault has been cleared upstream of the protective device 105a, the SCLPU module 110a causes the protective device 105a to close and re-energize a section of the distribution feeder circuit between the protective devices 105a, 105b, and 105d. After the SCLPU module 110b detects that the section of the distribution feeder circuit 100 between the protective device 105a and 105b has stabilized, the SCLPU module 110b closes the protective device 105b. Similarly, after the SCLPU module 110d detects that the section of the distribution feeder circuit 100 between the protective device 105a and 105d has stabilized, the SCLPU module 110d closes the protective device 105d. After the SCLPU module 110c detects that the section of the distribution feeder circuit 100 between the protective device 105b and 105c has stabilized, the SCLPU module 110c closes the protective device 105c.

In addition to dictating that the protective devices 105a-105d are progressively closed, the SCLPU modules 110a-110d also verify that the corresponding protective devices 105a-105d may be opened and closed automatically. For example, before signaling for the protective device 105b to be opened or closed, the SCLPU module 110b verifies that a human operator of the protective device 105b has not manually specified that the protective device 105b may not be opened or closed automatically. The human operator may specify that the protective device 105b may not be opened and subsequently closed automatically because the human operator may be working on the distribution feeder circuit 100 and does not want electrical load to be removed from or restored to the distribution feeder circuit 100.

Figure 2:
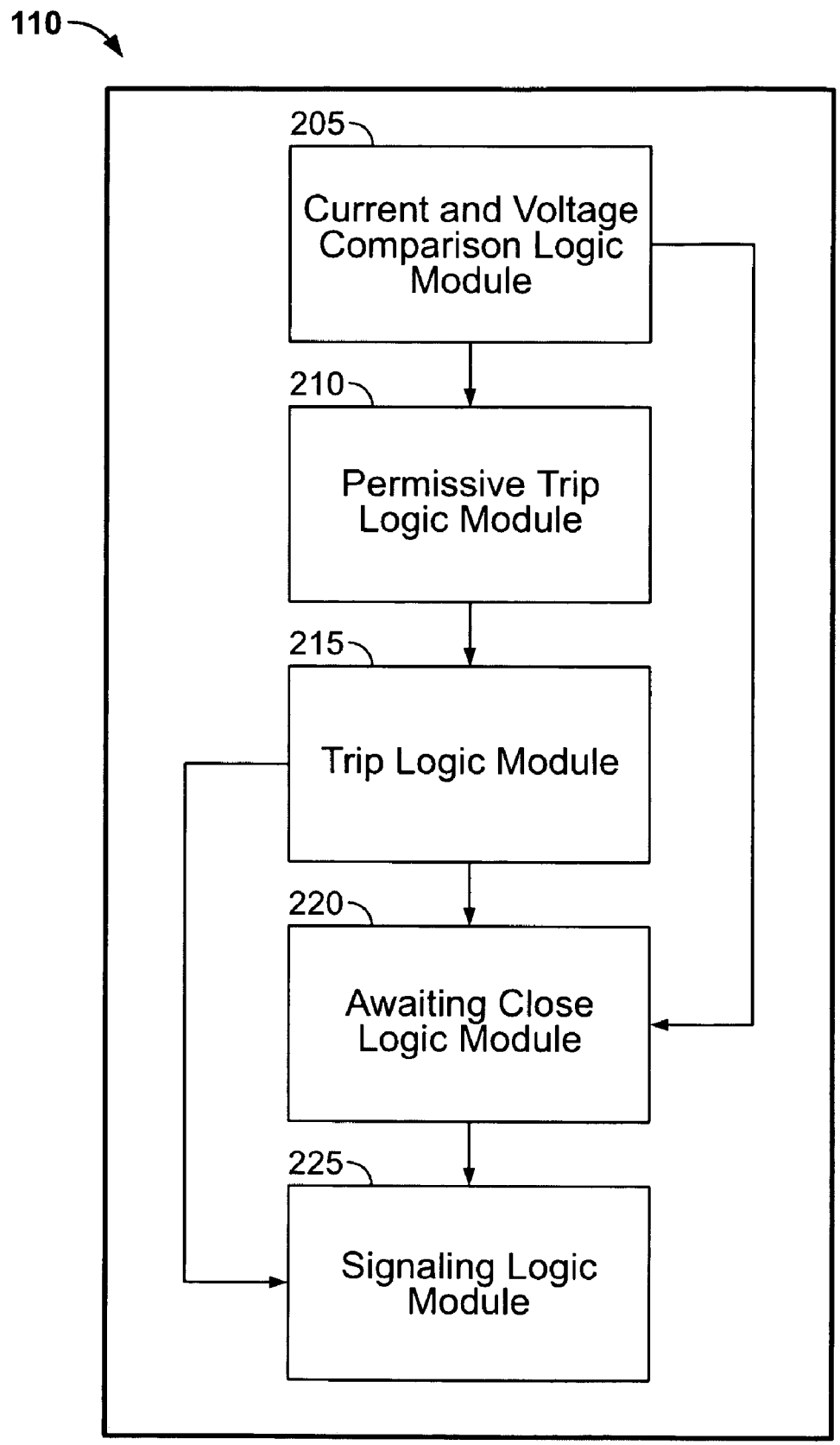
FIG. 2 is a block diagram of a smart cold load pick up module that signals for the cold load pick up operations of the distribution feeder circuit of FIG. 1.

Referring to FIG. 2, a SCLPU module 110 includes multiple logic modules 205-225 that collectively signal for a protective device that includes the SCLPU module 110 to be automatically opened and closed after a fault on a distribution feeder circuit protected by the protective device. For example, the SCLPU module 110 includes a current and voltage comparison logic module 205, a permissive trip logic module 210, a trip and await close logic module 215, an awaiting close logic module 220, and a trip and lockout and close logic module 225. The arrows between the logic modules 205-225 indicate the relationships between the logic modules 205-225. More particularly, an arrow from a first module to a second module indicates that the first module produces an output that is used by the second module. For example, the current and voltage comparison logic module 205 produces an output that is used by the permissive trip logic module 210, as evidenced by the arrow extending from the comparison logic module 205 to the permissive trip logic module 210. The output of the trip and lockout and close logic module 225 is the signal to trip or to close the protective device and represents the output of the SCLPU module as a whole.

The logic modules 205-225 perform various functions in the overall operation of the SCLPU module 110. For example, the comparison logic module 205 includes logic for comparing voltage and current levels of the distribution feeder circuit to determine if the distribution feeder circuit has been de-energized or re-energized. The permissive trip logic module 210 and the trip and await close logic module 215 include logic for verifying that characteristics of the protective device enable the protective device to be automatically opened or closed. The awaiting close logic module 220 verifies that the characteristics that enable the protective device to be automatically closed are held for a requisite amount of time. The trip and lockout and close logic module 225 includes logic for issuing a signal to open or close the protective device that includes the SCLPU module 110. The structure and function of each of the logic modules 205-225 are described below with respect to FIGS. 3A-3G and 4-7.

Figure 3A:
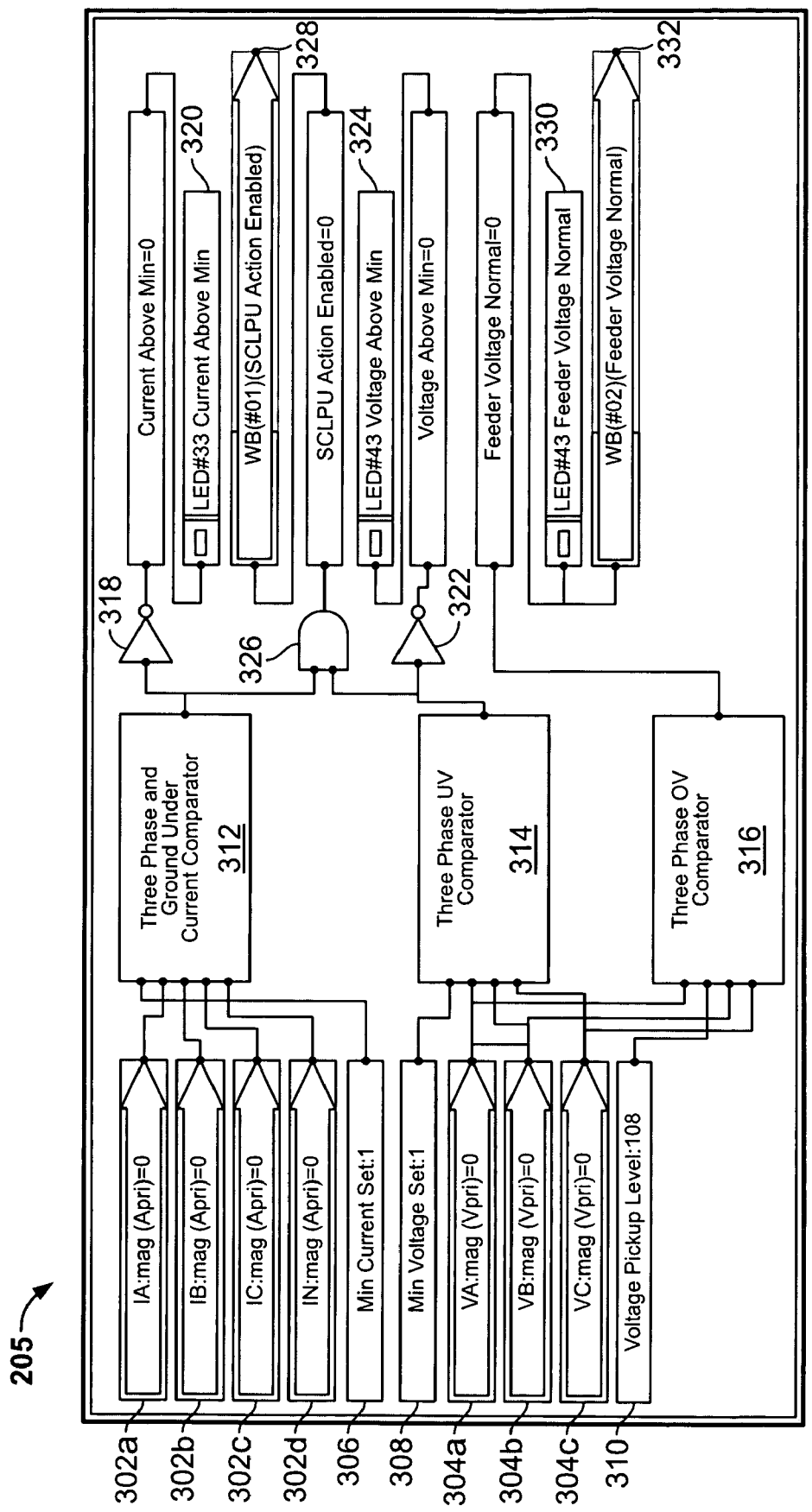
FIGS. 3A-3G and 4-7 are illustrations of logical operations that are implemented in the smart cold load pick up module of FIG. 2.

Referring to FIG. 3A, the current and voltage comparison logic module 205 determines whether a distribution feeder circuit has been de-energized or re-energized. The comparison logic module is included in the SCLPU module of a protective device that protects the distribution feeder circuit. The logic included in the comparison logic module 205 tests whether undercurrent, undervoltage, and overvoltage conditions exist in a distribution feeder circuit. An undercurrent condition exists when the current of all phases of electricity in the distribution feeder circuit are below a minimum level. Similarly, an undervoltage condition exists when the voltages of all phases of electricity in the distribution feeder circuit are below a minimum level. The distribution feeder circuit has been de-energized when both an undercurrent condition and an undervoltage condition exist. An overvoltage condition exists when the voltages of all phases of electricity in the distribution feeder circuit are above a threshold level. An overvoltage condition indicates that the distribution feeder circuit has been re-energized, perhaps as a result of a CLPU operation by an upstream protective device.

The comparison logic module 205 takes multiple inputs that help in determining if undercurrent, undervoltage, or overvoltage conditions exist. More particularly, current values 302a-302d are provided for the different phases (A, B, C) and neutral of the distribution feeder circuit. Similarly, voltage values 304a-304c are provided for the different phases (A, B, C) in the distribution feeder circuit. In addition, threshold values that define when undercurrent, undervoltage, or overvoltage conditions exist are provided to the comparison logic module 205. For example, a minimum current 306, a minimum voltage 308, and a voltage pickup 310 define when the undercurrent, undervoltage, or overvoltage conditions exist. For example, the minimum current 306 specifies that an undercurrent condition exists when the currents represented by the current values 302a-302d have a magnitude of less than 1 A. Likewise, the minimum voltage 308 specifies that an undervoltage condition exists when the voltages represented by the voltage values 304a-304c have a magnitude of less than 1 V. On the other hand, the voltage pickup 310 specifies that an overvoltage condition exists when the voltages represented by the voltage values 304a-304c have a magnitude of greater than 108 V.

Figure 3B:
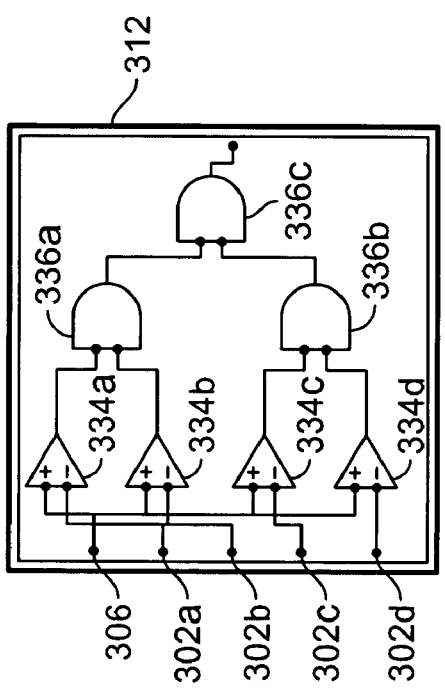

The current values 302a-302d and the minimum current 306 are input to an undercurrent comparator 312. The undercurrent comparator 312 is asserted when all of the current values 302a-302d are less than the minimum current 306 and is not asserted otherwise. Referring also to FIG. 3B, one implementation of the undercurrent comparator 312 uses a series of comparators 334a-334d and a series of AND gates 336a-336c. Each of the comparators 334a-334d compares one of the current values 302a-302d to the minimum current 306 and is asserted if the minimum current 306 is greater than the corresponding one of the current values 302a-302d. The series of AND gates 336a-336c combines the outputs of the comparators 334a-334d such that the undercurrent comparator 312 is asserted only when all four of the comparators 334a-334d are asserted.

Figure 3C:
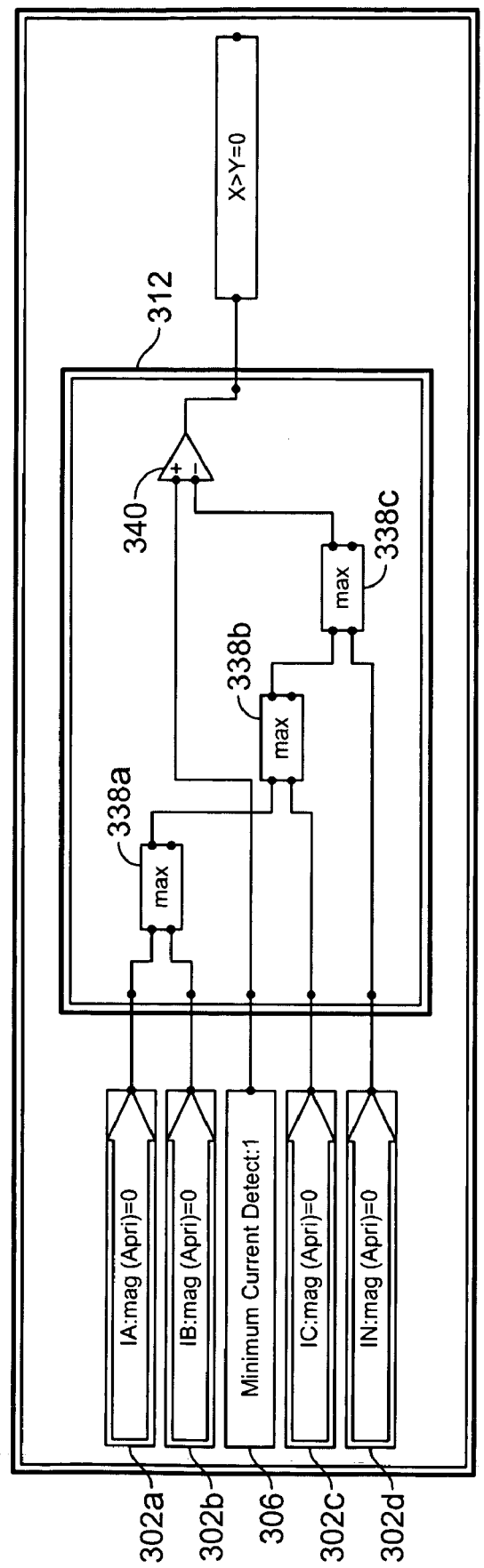

Referring also to FIG. 3C, another implementation of the undercurrent comparator 312 compares the minimum current 306 to the largest of the current values 302a-302d to determine if all of the current values 302a-302d are less than the minimum current 306. The largest of the current values 302a-302d is identified with a set of maximum gates 338a-338c. Each of the maximum gates 338a-338c outputs the greater of two input values. More particularly, the maximum gate 338a outputs the greater of the current values 302a and 302b. The maximum gate 338b outputs the greater of the output of the maximum gate 338a and the current value 302c. Similarly, the maximum gate 338c outputs the greater of the output of the maximum gate 338b and the current valued 302d. Therefore, the output of the last maximum gate 338c is the largest of the current values 302a-302d. A comparator 340 compares the largest value to the minimum current 306. The comparator 340 is asserted if the largest value is less than the minimum value 306, which indicates that all of the current values 302a-302d are less than the minimum value 306. The output of the comparator 340 therefore is the output of the undercurrent comparator 312.

Figure 3D:
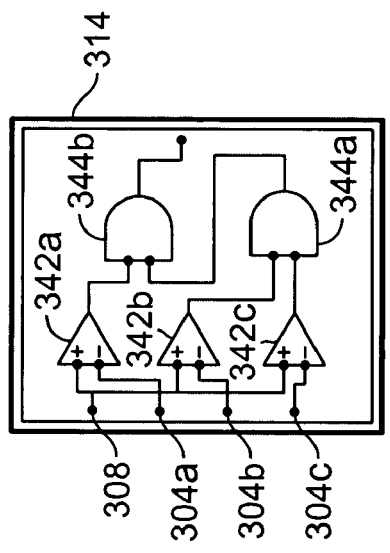

Referring again to FIG. 3A, the voltage values 304a-304c and the minimum voltage 308 are input into an undervoltage comparator 314. The undervoltage comparator 314 is asserted when all of the voltage values 304a-304c are less than the minimum voltage 308 and is not asserted otherwise. Referring also to FIG. 3D, one implementation of the undervoltage comparator 314 uses a series of comparators 342a-342c and a series of AND gates 344a-344b. Each of the comparators 342a-342c compares one of the voltage values 304a-304c to the minimum voltage 308 and is asserted if the minimum voltage 308 is greater than the corresponding one of the voltage values 304a-304c. The series of AND gates 344a-344b combines the outputs of the comparators 342a-342c such that the undervoltage comparator 314 is asserted only when all three of the comparators 342a-342c are asserted.

Figure 3E:
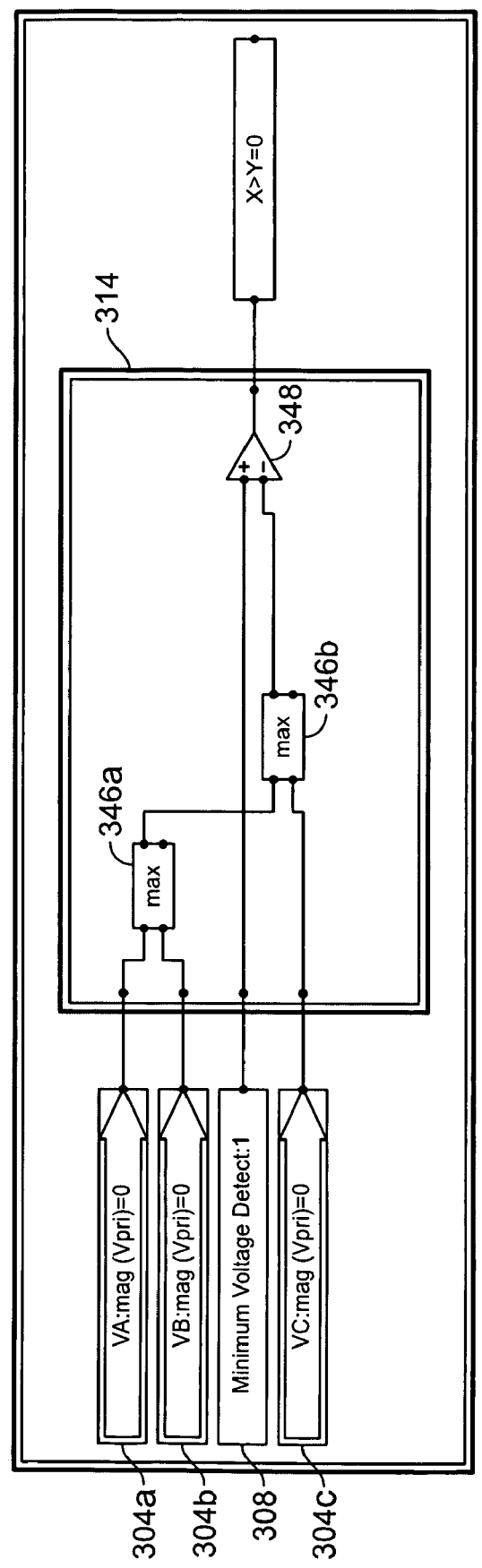

Referring also to FIG. 3E, another implementation of the undervoltage comparator 314 compares the minimum voltage 308 to the largest of the voltage values 304a-304c to determine if all of the voltage values 304a-304c are less than the minimum voltage 308. The largest of the voltage values 304a-304c is identified with a pair of maximum gates 346a and 346b. Each of the maximum gates 346a and 346b outputs the greater of two input values. More particularly, the maximum gate 346a outputs the greater of the voltage values 304a and 304b. The maximum gate 346b outputs the greater of the output of the maximum gate 346a and the voltage value 304c. Therefore, the output of the maximum gate 346b is the largest of the voltage values 304a-304c. A comparator 348 compares the largest value to the minimum voltage 308. The comparator 340 is asserted if the largest value is less than the minimum value 308, which indicates that all of the voltage values 304a-304c are less than the minimum value 308. The output of the comparator 340 therefore is the output of the undervoltage comparator 314.

Figure 3F:
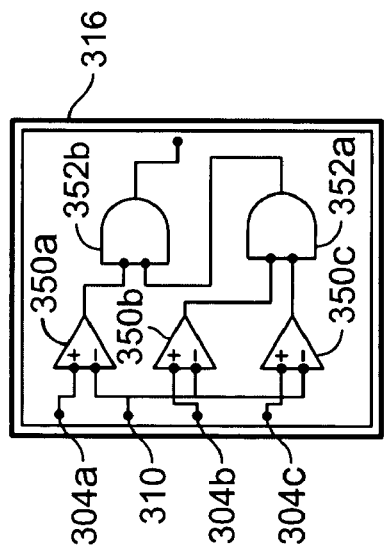

Referring again to FIG. 3A, the voltage values 304a and 304c are also input, along with the voltage pickup 310, to an overvoltage comparator 316. The overvoltage comparator 316 is asserted when all of the voltage values 304a-304c are greater than the voltage pickup 310 and is not asserted otherwise. Referring also to FIG. 3F, one implementation of the overvoltage comparator 316 uses a series of comparators 350a-350c and a pair of AND gates 352a and 352b. Each of the comparators 350a-350c compares one of the voltage values 304a-304c to the voltage pickup 310 and is asserted if the corresponding one of the voltage values 304a-304c is greater than the voltage pickup 310. The AND gates 352a and 352b combine the outputs of the comparators 350a-350c such that the overvoltage comparator 316 is asserted only when all four of the comparators 350a-350c are asserted.

Figure 3G:
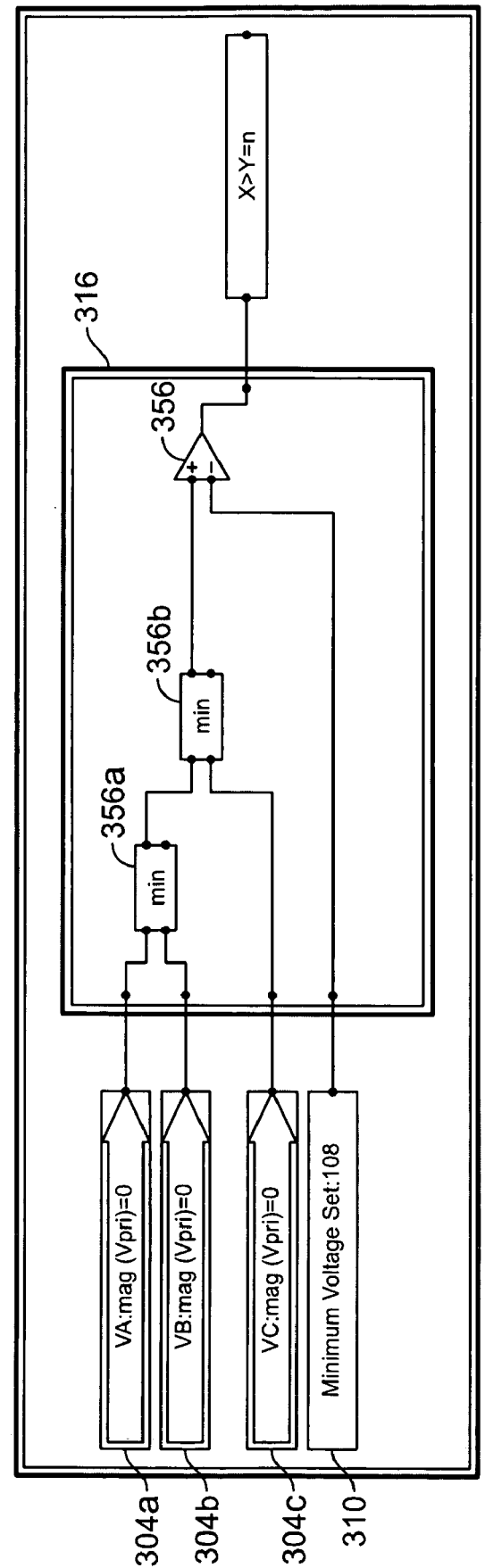

Referring also to FIG. 3G, another implementation of the overvoltage comparator 316 compares the voltage pickup 310 to the smallest of the voltage values 304a-304c to determine if all of the voltage values 304a-304c are greater than the voltage pickup 310. The smallest of the voltage values 304a-304c is identified with a pair of minimum gates 356a and 356b. Each of the minimum gates 356a and 356b outputs the smaller of two input values. More particularly, the minimum gate 356a outputs the lesser of the voltage values 304a and 304b. The minimum gate 356b outputs the lesser of the output of the minimum gate 356a and the voltage value 304c. Therefore, the output of the minimum gate 356b is the smallest of the voltage values 304a-304c. A comparator 356 compares the smallest value to the voltage pickup 310. The output of the comparator 356 is asserted if the smallest value is less than the minimum value 308, which indicates that all of the voltage values 304a-304c are less than the minimum value 308. The output of the comparator 356 therefore is the output of the overvoltage comparator 316.

Referring again to FIG. 3A, the output of the undercurrent comparator 312 is negated with a NOT gate 318, and the output of the NOT gate 318 drives a light emitting diode 320. The LED 320 is lit when the NOT gate 318 is asserted and is not lit otherwise. Therefore, the LED 320 is lit when an undercurrent condition does not exist. Similarly, the output of the undervoltage comparator 314 is negated with another NOT gate 322, and the output of the NOT gate 324 drives another LED 324 that is lit when an undervoltage current does not exist.

The outputs of the undercurrent comparator 312 and the undervoltage comparator 314 are inputted into an AND gate 326, the output of which sets a variable 328. The AND gate 326 is asserted when an undercurrent condition and an undervoltage condition exists, which is indicative of the distribution feeder circuit being de-energized. Therefore, an asserted value on the output of AND gate 326 (i.e., variable 328) indicates whether the distribution feeder circuit has been de-energized. The value of the variable 328 is used in other parts of the CLPU logic.

The output of the overvoltage comparator 316 is used to drive a third LED 330 that indicates whether an overvoltage condition exists. More particularly, the LED 330 is lit when an overvoltage condition exists. The output of the overvoltage comparator is also used to set a variable 332 that is indicative of the overvoltage condition.

Figure 4:
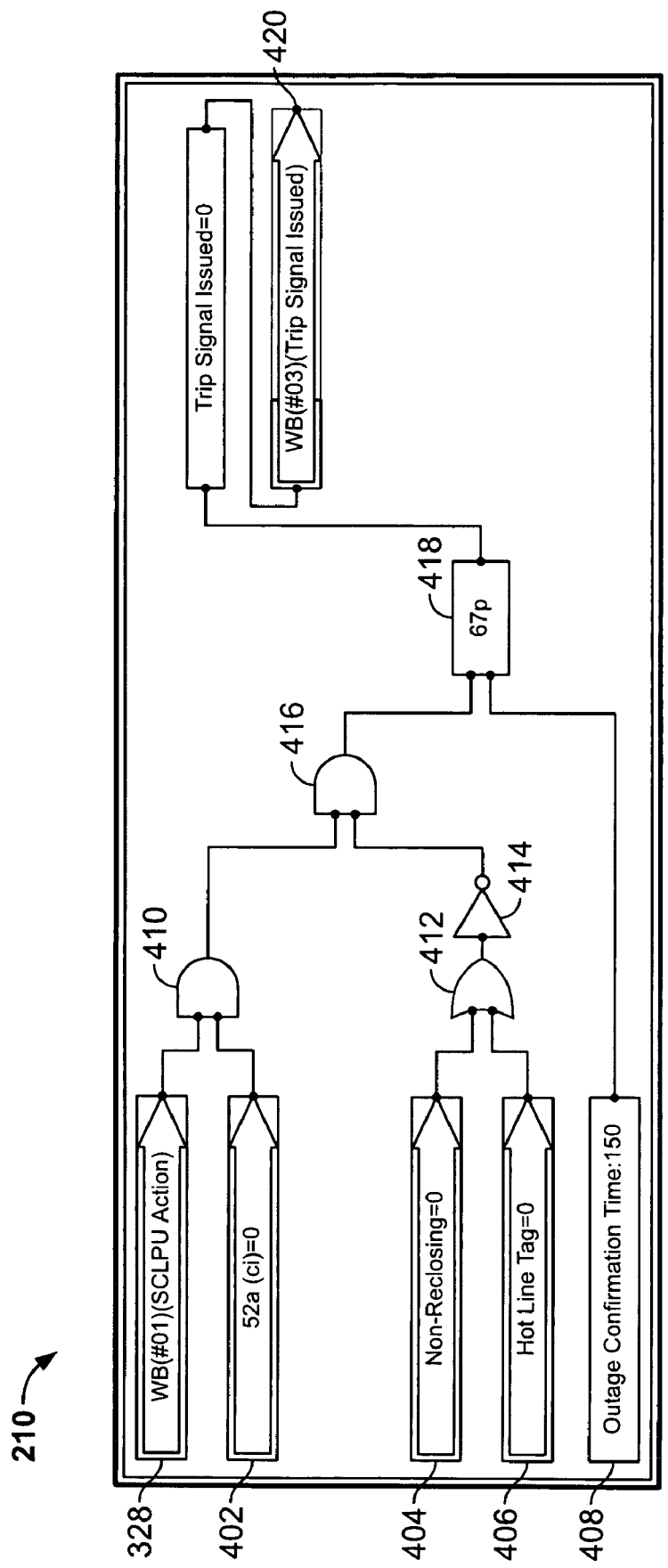

Referring to FIG. 4, the permissive trip logic module 210 verifies that a protective device executing the permissive trip logic module 210 may be opened and subsequently closed to re-energize a distribution feeder circuit protected by the protective device. The permissive trip logic module 210 is included in a SCLPU module of the protective device. The permissive trip logic takes the variable 328 produced by the comparison logic module 205 of FIG. 3A that indicates that the distribution feeder circuit has been de-energized. The permissive trip logic module 210 also has a closed input 402 that indicates whether the protective device is closed. The protective device is closed when the closed input 402 is asserted.

The permissive trip logic module 210 also takes a non-reclosing input 404 and a hot line tag input 406. Both the non-reclosing input 404 and the hot-line tag input 406 indicate whether the protective device may be tripped and then reclosed. The non-reclosing input 404 indicates whether the protective device may be tripped and reclosed remotely or manually without any special blocking action, while the hot line tag input 406 indicates that the protective device may be tripped reclosed only after a hot line tag applied to the protective device has been removed at the location where the hot line tag was applied. The hot line tag is applied to indicate when a reclosing action should not be performed, such as when maintenance is performed on the protective device. The application of the hot line tag blocks both automatic and manual reclosing of the protective device. In some implementations, if either the non-reclosing input 404 or the hot line tag input 406 is asserted, the protective device may not be opened and subsequently reclosed automatically. In other implementations, the permissive trip logic module 210 may be modified such that the non-reclosing input 404 and the hot line tag input 406 only prevent the protective device from being automatically closed after having been opened.

The final input to the permissive trip logic is an outage confirmation time 408. The outage confirmation time is the amount of time for which a power interruption must continue in order to be classified as an outage, after which a trip or opening operation is performed. In one implementation, the outage confirmation time is 150 seconds.

The variable 328 and the closed input 402 serve as the inputs to an AND gate 410. Similarly, the non-reclosing input 410 and the hot line tag 406 serve as inputs to an OR gate 412, the output of which is negated with a NOT gate 414. The outputs of the AND gate 410 and the NOT gate 414 are the inputs to a second AND gate 416. Assertion of the AND gate 416 indicates that the protective device is closed, that the distribution feeder circuit has de-energized, and that human operators are not preventing the protective device from being opened and subsequently closed with the non-reclosing input 404 or the hot line tag 406. In other words, an asserted output of the AND gate 416 indicates that the protective device may be tripped and subsequently reclosed to re-energize the distribution feeder circuit downstream of the protective device. A timer 418 ensures that such an indication is asserted for a time specified by the outage confirmation time 416. The timer 418 only is asserted if the AND gate 416 remains asserted for longer than the time specified by the outage confirmation time 410. Therefore, a CLPU operation is only performed in response to prolonged de-energization. The output of the timer 418 is used to set a variable 420 that indicates that a trip operation may be performed.

Figure 5:
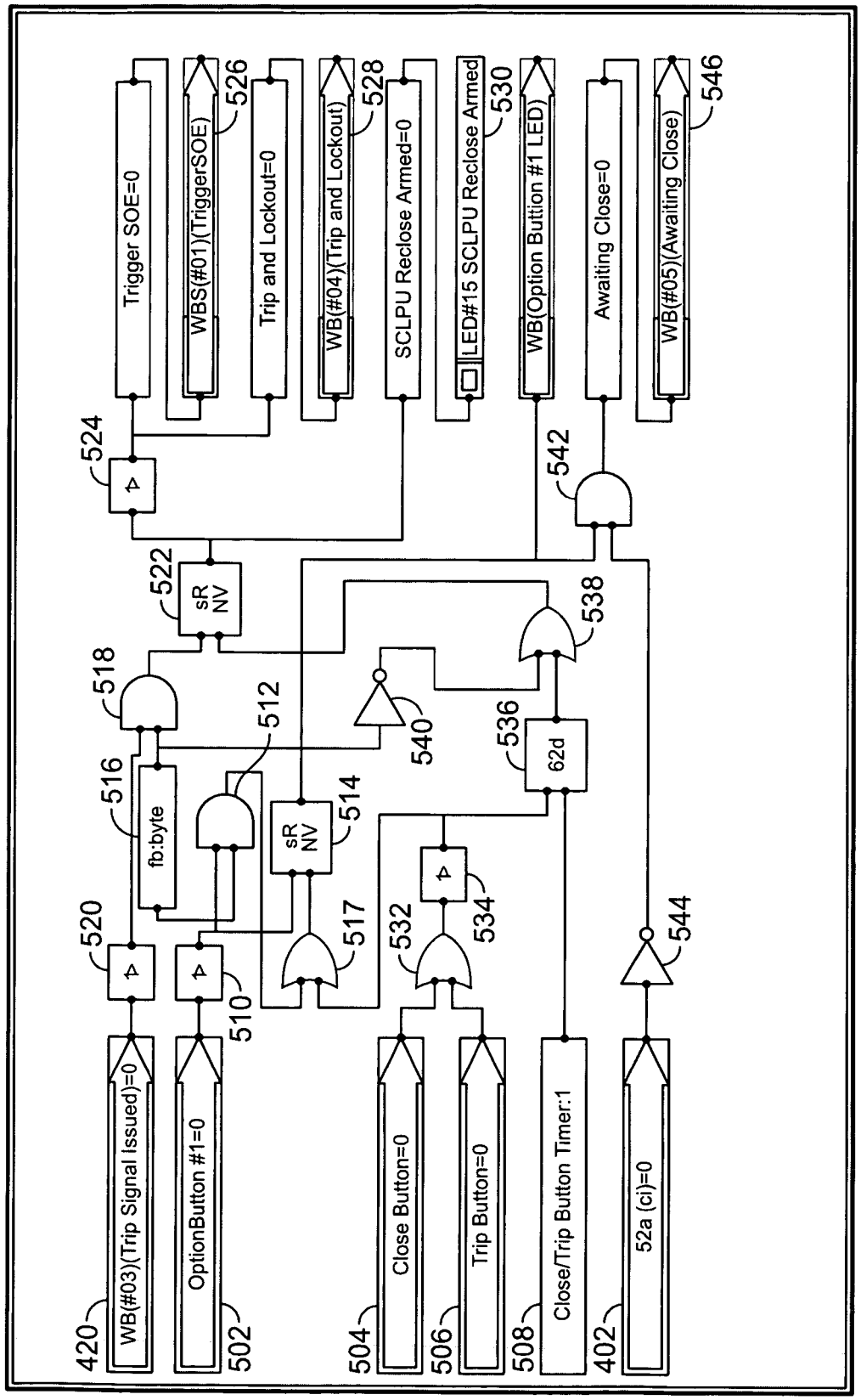

Referring to FIG. 5, the trip and await close logic module 215 further verifies that a protective device executing the logic included in the trip and await close logic module 215 may be opened and closed again after a distribution feeder circuit protected by the protective device is de-energized. The trip and await close logic module 215 is included in a SCLPU module of the protective device. The trip and await close logic module 215 takes the variable 420 produced by the permissive trip logic module 210 of FIG. 4 as an input. The variable 420 indicates that a trip operation and a subsequent reclose operation may be performed to re-energize the distribution feeder circuit. The trip logic also receives inputs from three buttons 502-506. For example, an option button 502 is connected to a button that enables and disables automatic closing of the protective device when pressed. Pressing the button once enables automatic closing of the protective device, and pressing the button again disables automatic closing of the protective device. A close button 504 and a trip button 506 are used to indicate that the protective device is being manually closed or tripped, respectively. If either the close button 504 or the trip button 506 is asserted after the button connected to the option button input 502 is depressed to enable an SCLPU operation, the protective device is returned to manual operation, with automatic tripping and closing disabled until the button is again depressed. The trip and await close logic module 215 also receives a button actuated timer input 508 that ensures that a non-volatile memory module 522 is properly reset to an unasserted condition. The trip and await close logic module 215 also uses the closed input 402 of FIG. 4 that indicates whether the protective device is closed.

The option button 502 is asserted each time the corresponding button on the protective device is pressed. The signal produced by the option button 502 passes through an edge detector 510 that is asserted in response to a rising edge in the signal from the option button 502. The output of the edge detector 510 is passed to an AND gate 512 and a non-volatile memory module 514. A feedback block feeds back the output of the non-volatile memory module 514 to the second input of the AND gate 512. The non-volatile memory module 514 is asserted when the upper input from the edge detector 510 is asserted. The non-volatile memory module 514 remains asserted until an asserted value is received on the lower input of the non-volatile memory module 514, which comes from the output of the AND gate 514 through an OR gate 517. Therefore, the non-volatile memory module 514 has an asserted output after the button corresponding to the option button 502 has been pressed once and an unasserted output after the button has been pressed twice.

The output of the non-volatile memory module 514 is passed to an AND gate 518. The second input to the AND gate 518 comes from an edge detector 520 that is asserted by a rising edge from the variable 420, which indicates that the protective device is to be tripped. The AND gate 518 is asserted when a trip signal has been issued, as indicated by the variable 420, and after the option button 502 has been asserted once.

The output of the AND gate 518 is passed to another non-volatile memory module 522. The output of the non-volatile memory module 522 is asserted when the AND gate 520 is asserted. The output of the non-volatile memory module 522 is passed to an edge detector 524, the output of which is used to set two variables 526 and 528. The variable 526 is used to cause an entry to be created in a sequence of events log for the protective device. The entry indicates that the protective device is being tripped. The variable 528 is used to indicate that the protective device is to be tripped in response to a fault. The output of the non-volatile memory module 522 also is used to drive a LED 530 that indicates that the protective device may be reclosed because a signal to trip the protective device has been issued through the variable 528.

The lower input of the non-volatile memory module 522, which is used to reset the non-volatile memory module 522, is derived from the other inputs to the trip and await close logic module 215. The close button 504 and the trip button 506 are passed to an OR gate 532, the output of which is passed to an edge detector 534. The edge detector 534 is asserted when one of the close button 504 or the trip button 506 becomes asserted. The output of the edge detector 534 is passed to the second input to the OR gate 517 such that the output of the edge detector 534 may be used to reset the non-volatile memory module 514.

A timer 536 verifies that the close button 504 or the trip button 506 is asserted for at least the amount of time specified by the button timer input 508. The timer 536 has an asserted output if the output of the edge detector 534 remains asserted for the amount of time indicated by the button timer input 508. The output of the timer 536 is passed as an input to an OR gate 538. The second input to the OR gate 538 is the output of a NOT gate 540 that negates the output of the non-volatile memory module 514. The NOT gate 540 is asserted when the option button 502 has been asserted a second time. If either the NOT gate 533 or the timer 530 is asserted, the output of the OR gate 538 is asserted, and the output of the non-volatile memory module 522 is reset. When the output of the non-volatile memory module 522 is reset, the variables 526 and 528 are no longer asserted, and the LED 530 is no longer lit.

The output of the non-volatile memory module 514 also is passed to an AND gate 542. The second input of the AND gate 542 is the output of a NOT gate 544 that negates the value of the closed input 502. Therefore, the NOT gate 544 is asserted when the protective device is not closed, and the AND gate 542 is asserted when the NOT gate 544 is asserted after the option button 502 has been asserted for the first time. The output of the AND gate 542 is used to set a variable 546 that is used to indicate that the protective device has been tripped and is waiting to be closed.

Figure 6:
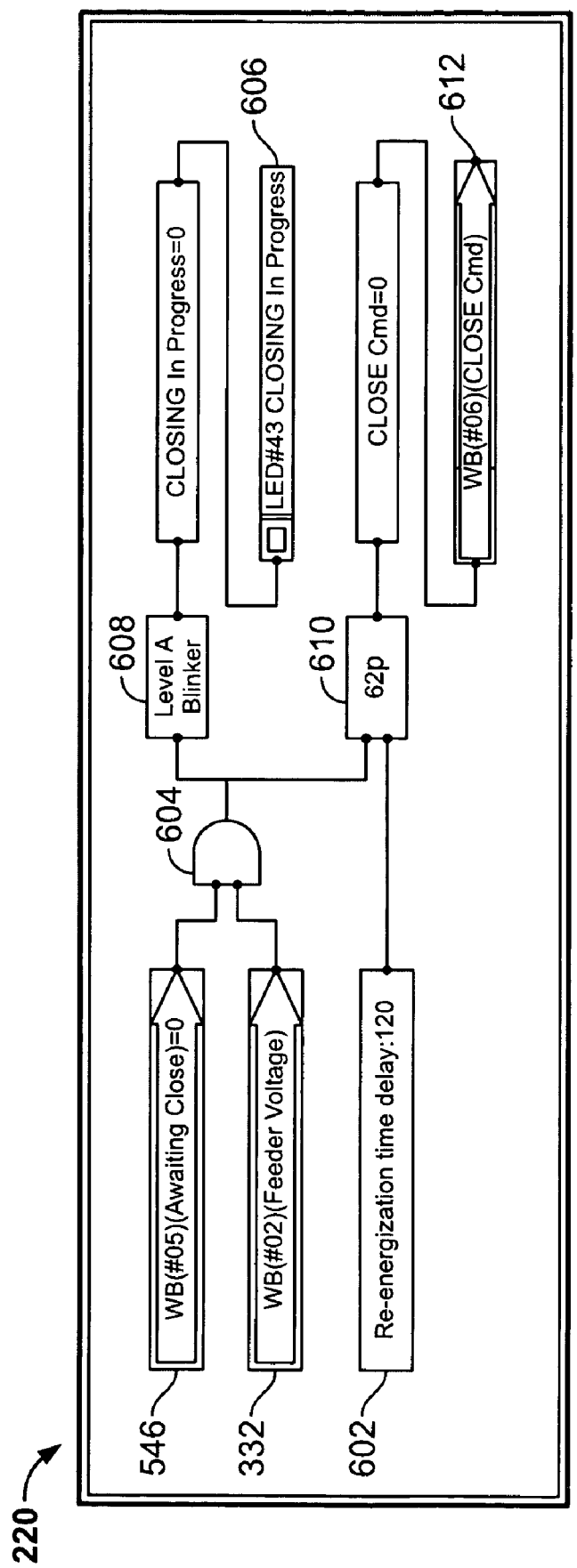

Referring to FIG. 6, the awaiting close logic module 220 verifies that conditions within a protective device allow the protective device to be closed. The awaiting close logic module 220 is included in a SCLPU module of the protective device. The awaiting close logic module 220 takes as an input the variable 546 produced by the trip and await close logic module 215 of FIG. 5 that indicates that conditions within the protective device enable the protective device to be closed. The awaiting close logic module 220 also takes as an input the variable 332 produced by the comparison logic module 205 of FIG. 3A that indicates that an overvoltage condition exists within the protective device. The awaiting close logic module 220 also has a re-energization time delay input 602 that specifies a minimum time for which the conditions allowing the protective device to be closed are to be held before the protective device is closed.

The variable 546 and the variable 332 are input into an AND gate 604. The variable 546 indicates that a CLPU operation is awaited, and the variable 332 indicates that the voltage conditions within the distribution feeder circuit are appropriate for a CLPU operation. Therefore, when the AND gate 604 is asserted, a CPLU operation may be performed. The output of the AND gate 604 drives a LED 606 so that the LED 606 is lit when a CPLU operation may be performed. In some implementations, the output of the AND gate 604 may be connected to a blinker 608 that in turn drives the LED 606. More particularly, when the AND gate is asserted, the blinker 608 alternates between being asserted and unasserted, thereby causing the LED 606 to blink. However, when the AND gate 604 is not asserted, the blinker 608 is constantly unasserted and the LED 606 is not lit.

The output of the AND gate 604 is also input to a pickup timer 610 having a time limit specified by the re-energization time delay 602. The pickup timer 610 is asserted if the AND gate 604 remains asserted for longer than the re-energization time delay 602. The distribution feeder circuit is stable enough for a CLPU operation to occur if the pickup timer 610 is asserted. Otherwise, the distribution feeder circuit is not stable enough for a CLPU operation. The output of the pickup timer 610 is used to set a variable 612 that is used to start a CLPU operation. A CLPU operation is started when the variable 612 is asserted.

Figure 7:
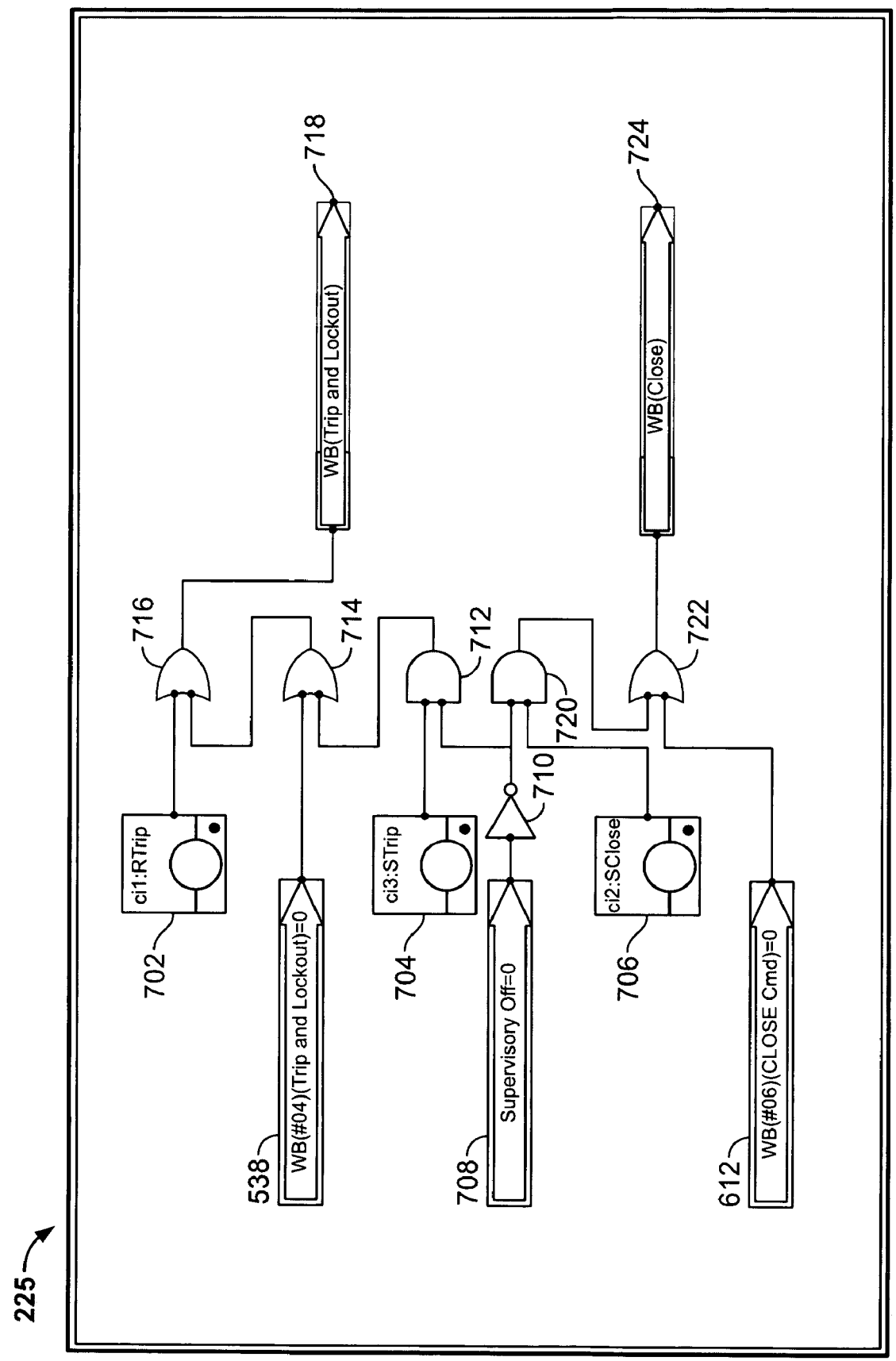

Referring to FIG. 7, the trip and lockout and close logic module 225 issues a signal to trip or to close a protective device executing the logic included in the trip and lockout and close logic module 225. The trip and lockout and close logic module 225 is included in a SCLPU module of the protective device. The trip and lockout and close logic module 225 combines signals to trip or to close the protective device from multiple external sources, scratch logic, or base logic, and issues trip or close signals to the protective device. The trip and lockout and close logic module 225 takes as an input the variable 612 of FIG. 6 that indicates that the protective device is to be closed as part of a CLPU operation. The trip and lockout and close logic module 225 also receives the variable 538 of FIG. 5, which indicates that the protective device is to be tripped and locked out, as an input.

The trip and lockout and close logic module 225 also receives trip and close signals from various other sources. For example, the trip and lockout and close logic module 225 may receive an unsupervised trip signal 702 issued by other logic implemented on the protective device. The trip and lockout and close logic module 225 also may receive a supervised trip signal 704 issued for the protective device. In addition, the trip and lockout and close logic module 225 may receive a supervised close signal 706 issued for the protective device. The trip and lockout and close logic module 225 also receives a supervisory input 708 that indicates whether supervised operations, such as the operations signaled for with the inputs 704 and 706, should be executed. The supervisory input 708 is asserted when supervised operations should not be executed.

The supervisory input is negated with a NOT gate 710, and the output of the NOT gate is passed to an AND gate 712. The supervised trip signal 704 is also passed as an input to the AND gate 712, which means that the AND gate 712 is asserted when a supervised trip signal has been received and when supervised operations are authorized. The output of the AND gate 712 is passed to an OR gate 714 along with the variable 538. The output of the OR gate 714 is passed to a second OR gate 716 along with the unsupervised trip signal 702, and the output of the OR gate 716 is used to set the value of a trip and lockout variable 718 that is asserted when either a trip signal is received from base logic, as indicated by the trip signal 702 or the variable 538, or from the supervised trip signal 704. If the trip and lockout variable 718 is asserted, then the protective device is tripped.

The supervised close signal 706 and the output of the NOT gate 710 are passed to an AND gate 720 that is asserted when a supervised close signal has been received and when supervised operations are authorized. The output of the AND gate 720 is passed to an OR gate 722 the output of which is used to set the value of a close variable 724 that is asserted when either a signal to close the protective device is produced through execution of base logic, as indicated by the variable 612, or from the supervised close signal 706. If the close variable 724 is asserted, then the protective device is reclosed.

It will be understood that various modifications may be made without departing from the spirit and scope of the claims. For example, advantageous results still could be achieved if steps of the disclosed techniques were performed in a different order and/or if components in the disclosed systems were combined in a different manner and/or replaced or supplemented by other components. Accordingly, other implementations are within the scope of the following claims.

What is claimed is:

1. A method for automatically reenergizing a section of a distribution feeder circuit, the method comprising:
   detecting, using a module of a protective device, if a section of a distribution feeder circuit upstream of the protective device has been de-energized;
   detecting, using the module, whether the protective device may be opened automatically;
   signaling, using the module, for the protective device to be opened when (1) the section of the distribution feeder circuit upstream of the protective device has been de-energized and (2) the protective device may be opened automatically;
   detecting, using the module, whether the protective device has been opened;
   detecting, using the module, whether the protective device may be closed automatically;
   detecting, using the module, whether the section of the distribution feeder circuit upstream of the protective device has stabilized; and
   signaling, using the module, for the protective device to be closed automatically when (1) the protective device has been opened automatically and may be closed automatically and (2) the section of the distribution feeder circuit upstream of the protective device has stabilized.

2. The method of claim 1 wherein detecting if a section of a distribution feeder circuit upstream of a protective device has been de-energized comprises:
   detecting whether magnitudes of current of three phases of electricity flowing through the section of the distribution feeder circuit are each below a minimum current value;
   detecting whether magnitudes of voltage of the three phases of electricity flowing through the section of the distribution feeder circuit are each below a minimum voltage value;
   detecting whether a magnitude of a residual ground current is below a minimum current value; and
   determining that the section of the distribution feeder circuit upstream of the protective device has been de-energized when the magnitudes of the current of the three phases of electricity flowing through the section of the distribution feeder circuit are each below the minimum current value, when the magnitudes of the voltage of the three phases of electricity flowing through the section of the distribution feeder circuit are each below the minimum voltage value, and when the magnitude of the residual ground current is below the minimum current value.

3. The method of claim 1 wherein detecting if a section of the distribution feeder circuit protected by a protective device has been de-energized comprises detecting if the distribution feeder circuit has been de-energized for longer than a de-energization threshold amount of time.

4. The method of claim 1 wherein detecting whether the protective device may be opened automatically comprises detecting if a human operator of the protective device has specified that the protective device is not to be opened automatically.

5. The method of claim 4 wherein detecting if a human operator of the protective device has specified that the protective device is not to be opened automatically comprises detecting if the human operator has applied a hot line tag to the protective device.

6. The method of claim 4 wherein detecting if a human operator of the protective device has specified that the protective device is not to be opened automatically comprises detecting if the human operator has specified that the protective device is non-reclosing.

7. The method of claim 4 wherein detecting if a human operator of the protective device has specified that the protective device is not to be opened automatically comprises detecting if the human operator pressed a trip button in advance of manually tripping the protective device to prevent the protective device from being opened automatically.

8. The method of claim 4 wherein detecting if a human operator of the protective device has specified that the protective device is not to be opened automatically comprises detecting if the human operator pressed a close button in advance of manually closing the protective device to prevent the protective device from being opened automatically.

9. The method of claim 4 wherein detecting if a human operator of the protective device has specified that the protective device is not to be opened automatically comprises detecting if the human operator pressed an option button that enables an automatic cold load pick up operation.

10. The method of claim 1 wherein detecting whether the protective device may be closed automatically comprises detecting if a human operator of the protective device has specified that the protective device is not to be closed automatically.

11. The method of claim 10 wherein detecting if a human operator of the protective device has specified that the protective device is not to be closed automatically comprises detecting if the human operator has applied a hot line tag to the protective device.

12. The method of claim 10 wherein detecting if a human operator of the protective device has specified that the protective device is not to be closed automatically comprises detecting if the human operator has specified that the protective device is non-reclosing.

13. The method of claim 10 wherein detecting if a human operator of the protective device has specified that the protective device is not to be closed automatically comprises detecting if the human operator pressed a trip button in advance of manually tripping the protective device to prevent the protective device from being closed automatically.

14. The method of claim 10 wherein detecting if a human operator of the protective device has specified that the protective device is not to be closed automatically comprises detecting if the human operator pressed a close button in advance of manually closing the protective device to prevent the protective device from being closed automatically.

15. The method of claim 10 wherein detecting if a human operator of the protective device has specified that the protective device is not to be closed automatically comprises detecting if the human operator pressed an option button that enables an automatic cold load pick up operation.

16. The method of claim 1 wherein detecting whether the section of the distribution feeder circuit upstream of the protective device has stabilized comprises detecting whether magnitudes of voltage of three phases of electricity flowing through the section remain above a normal operating voltage magnitude.

17. The method of claim 1 wherein signaling for the protective device to be closed automatically when the protective device may be closed automatically comprises:
   detecting whether the protective device has been able to be closed automatically for longer than a threshold time; and
   signaling for the protective device to be closed automatically when the protective device has been able to be closed automatically for longer than the threshold time.

18. The method of claim 1 wherein the protective device comprises a recloser.

19. The method of claim 1 wherein the protective device comprises a breaker.

20. The method of claim 1 wherein the protective device comprises a switch.

21. A system for reenergizing a section of a distribution feeder circuit, the system comprising:
   a protective device connected to a distribution feeder circuit that protects a section of the distribution feeder circuit downstream of the protective device;
   logic implemented on the protective device for detecting whether a section of a distribution feeder circuit upstream of the protective device has been de-energized;
   logic implemented on the protective device for detecting whether the protective device may be opened automatically;
   logic implemented on the protective device for signaling for the protective device to be opened when the section of the distribution feeder circuit upstream of the protective device has been de-energized and when the protective device may be opened automatically;
   logic implemented on the protective device for detecting whether the protective device has been opened in response to a fault on the distribution feeder circuit;
   logic implemented on the protective device for detecting whether the protective device may be closed automatically;
   logic implemented on the protective device for detecting whether the section of the distribution feeder circuit upstream of the protective device has stabilized; and
   logic implemented on the protective device for signaling for the protective device to be closed automatically when the protective device has been opened automatically and may be closed automatically and when the section of the distribution feeder circuit upstream of the protective device has stabilized to re-energize the section of the distribution feeder circuit downstream of the protective device.

22. The system of claim 21 wherein the logic for detecting whether the section of the distribution feeder circuit upstream of the protective device has been de-energized includes:
   minimum current logic for determining whether magnitudes of current of three phases of electricity flowing through the distribution feeder circuit are each below a minimum current value;
   minimum voltage logic for determining whether magnitudes of voltage of the three phases of electricity flowing through the section of the distribution feeder circuit are each below a minimum voltage value;
   minimum residual ground current logic for determining whether a magnitude of a residual ground current is below a minimum current value; and
   combination logic for combining outputs of the minimum current logic, the minimum voltage logic, and the minimum residual ground current logic to determine whether the distribution feeder circuit has been de-energized.

23. The system of claim 21 wherein the logic for detecting whether the section of the distribution feeder circuit upstream of the protective device has been de-energized includes logic for determining whether the distribution feeder circuit has been de-energized for longer than a de-energization threshold amount of time.

24. The system of claim 21 wherein the logic for detecting whether the protective device may be opened automatically includes logic for detecting if a human operator of the protective device has specified that the protective device may not be opened automatically.

25. The system of claim 24 wherein the logic for detecting if a human operator of the protective device has specified that the protective device may not be opened automatically includes logic for detecting if the human operator has applied a hot line tag to the protective device.

26. The system of claim 24 wherein the logic for detecting if a human operator of the protective device has specified that the protective device may not be opened automatically includes logic for detecting if the human operator has specified that the protective device is non-reclosing.

27. The system of claim 24 wherein the logic for detecting if a human operator of the protective device has specified that the protective device may not be opened automatically includes logic for detecting if the human operator pressed a trip button in advance of manually tripping the protective device to prevent the protective device from being opened automatically.

28. The system of claim 24 wherein the logic for detecting if a human operator of the protective device has specified that the protective device may not be opened automatically includes logic for detecting if the human operator pressed a close button in advance of manually closing the protective device close to prevent the protective device from being opened automatically.

29. The system of claim 24 wherein the logic for detecting if a human operator of the protective device has specified that the protective device may not be opened automatically includes logic for detecting if the human operator pressed an option button that enables an automatic cold load pick up operation.

30. The system of claim 21 wherein the logic for detecting whether the protective device may be closed automatically includes logic for detecting if a human operator of the protective device has specified that the protective device may not be closed automatically.

31. The system of claim 30 wherein the logic for detecting if a human operator of the protective device has specified that the protective device may not be closed automatically includes logic for detecting if the human operator has applied a hot line tag to the protective device.

32. The system of claim 30 wherein the logic for detecting if a human operator of the protective device has specified that the protective device may not be closed automatically includes logic for detecting if the human operator has specified that the protective device is non-reclosing.

33. The system of claim 30 wherein the logic for detecting if a human operator of the protective device has specified that the protective device may not be closed automatically includes logic for detecting if the human operator pressed a trip button in advance of manually tripping the protective device to prevent the protective device from being closed automatically.

34. The system of claim 30 wherein the logic for detecting if a human operator of the protective device has specified that the protective device may not be closed automatically includes logic for detecting if the human operator pressed a close button in advance of manually closing the protective device close to prevent the protective device from being closed automatically.

35. The system of claim 30 wherein the logic for detecting if a human operator of the protective device has specified that the protective device may not be closed automatically includes logic for detecting if the human operator pressed an option button that enables an automatic cold load pick up operation.

36. The system of claim 21 wherein the logic for detecting whether the section of the distribution feeder circuit upstream of the protective device has stabilized includes logic for detecting whether magnitudes of voltage of three phases of electricity flowing through the section remain above a normal operating voltage magnitude.

37. The system of claim 21 wherein the logic for signaling for the protective device to be closed after the protective device has been opened in response to a fault on the distribution feeder circuit includes:
    logic for detecting whether the protective device has been able to be closed for longer than a threshold time; and
    logic for signaling for the protective device to be closed when the protective device has been able to be closed for longer than the threshold time.

38. The system of claim 21 wherein the protective device comprises a recloser.

39. The system of claim 21 wherein the protective device comprises a breaker.

40. The system of claim 21 wherein the protective device comprises a switch.

41. The system of claim 21 wherein the logic implemented on the protective device is included in a smart cold load pick up module implemented on the protective device.

42. The system of claim 41 wherein the smart cold load pickup module is included in a scratch logic portion of the protective device.

43. The system of claim 41 wherein the smart cold load pickup module is included in a base logic portion of the protective device.

44. A method for restoring electrical load to a distribution feeder circuit, the method comprising:
    detecting a fault on a distribution feeder circuit;
    opening a first protective device downstream of the fault to prevent damage to downstream sections of the distribution feeder circuit as a result of the fault;
    opening a second protective device downstream of the first protective device in response to the opening of the first protective device;
    detecting when the fault has been cleared and electrical service has stabilized;
    signaling for the first protective device to be closed through execution of logic implemented on the first protective device to reapply electrical load to a section of the distribution feeder circuit between the first protective device and the second protective device;
    waiting for the section of the distribution feeder circuit to stabilize after the first protective device is closed through execution of logic implemented on the second protective device; and
    signaling for the second protective device to be closed through execution of the logic implemented on the second protective device to reapply the electrical load to the section of the distribution feeder circuit downstream of the second protective device.

45. The method of claim 44 wherein waiting for the section of the distribution feeder circuit to stabilize comprises waiting for a period of time needed for the section of the distribution feeder circuit to stabilize.

46. The method of claim 44 wherein detecting when the fault has been cleared comprises detecting a normal operating voltage upstream of the first protective device.

47. The method of claim 44 wherein the first and the second protective devices are reclosers.

48. The method of claim 44 wherein the first and the second protective devices are breakers.

49. The method of claim 44 wherein the first and the second protective devices are switches.

50. The method of claim 44 wherein detecting a fault on the distribution feeder circuit comprises detecting an abnormally high voltage on the distribution feeder circuit.

51. The method of claim 44 wherein detecting a fault on the distribution feeder circuit comprises detecting an abnormally high current on the distribution feeder circuit.

* * * * *